March 20, 1928.
J. L. LESLIE
1,662,860
HEAT INSULATED VESSEL FOR FOOD
Filed June 16, 1925
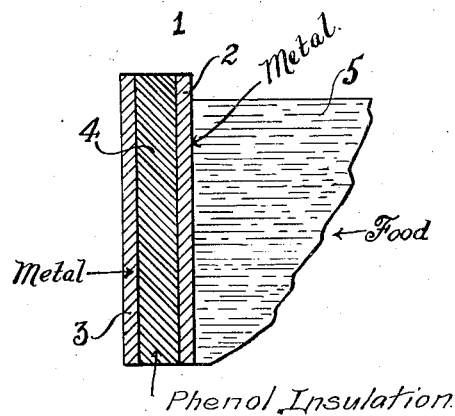
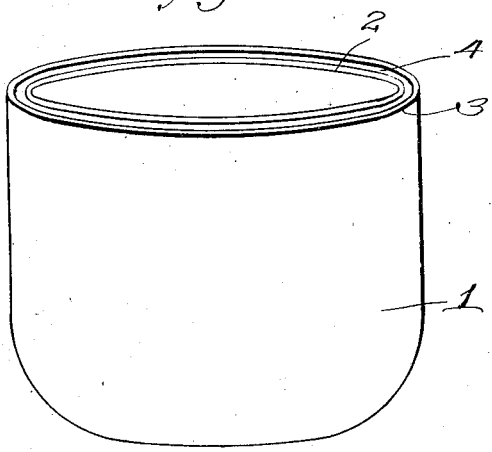
John L. Leslie
Inventor Patented Mar. 20, 1928.

1,662,860

UNITED STATES PATENT OFFICE.

JOHN L. LESLIE, OF NEW YORK, N. Y.

HEAT-INSULATED VESSEL FOR FOOD.

Application filed June 16, 1925. Serial No. 37,415.

The object of my invention is to provide a container for foodstuffs such as coffee pots, cups, bowls, plates, bottles, etc., of any desirable form, shape or size which may be used for retaining food at a constant temperature, whether hot or cold.

This object is accomplished by my invention which, briefly stated, is a vessel composed of two nesting metal shells separated by a heat insulating compound of the phenol formaldehyde group.

For a more particular description of my invention, reference is to be had to the accompanying drawing, forming a part hereof, in which the Figure 1 is a sectional view showing the same.

Figure 2 is a perspective view of a receptacle.

My improved vessel 1 is composed of an inner shell 2 of metal and an outer shell 3 of metal and these two shells are separated by bakelite 4 which is sandwiched in between them and which acts as a heat insulator so that the food 5 which is within the vessel is kept at a constant temperature, that is, if it be hot it remains hot and if it be cool it remains cool and regardless of the contents, the outer shell 3 of metal will remain at normal temperatures so that the vessel can be easily handled.

As above stated, this invention may be applied to any suitable form of vessel where heat insulation is desired. If a cup be made according to this invention, it may be used for hot coffee without danger of burning the lips of the person drinking from the same. Moreover, articles made as herein described, are practically indestructible.

While I have shown and described one embodiment of my invention, it is obvious that it is not restricted thereto, but that it is broad enough to cover all structures that come within the scope of the annexed claim.

Having thus described my invention, what I claim is:

A food containing vessel comprising an outer integral shell of metal, an inner integral shell of metal spaced throughout at substantially the same distance from said outer shell and a heat insulating compound of the phenol formaldehyde group disposed at all points between said shells for holding them together in spaced relation whereby an unbreakable insulated vessel is formed and the inner shell is entirely heat insulated from the outer shell.

In testimony whereof, I have hereunto set my hand this 15th day of June, 1925.

JOHN L. LESLIE.